UNITED STATES PATENT OFFICE.

EDWIN O. BARSTOW AND COULTER W. JONES, OF MIDLAND, MICHIGAN, ASSIGNORS TO THE DOW CHEMICAL COMPANY, OF MIDLAND, MICHIGAN, A CORPORATION OF MICHIGAN.

PROCESS OF MAKING POTASSIUM BROMID.

1,392,905.      Specification of Letters Patent.      Patented Oct. 11, 1921.

No Drawing.      Application filed May 17, 1917. Serial No. 169,178.

*To all whom it may concern:*

Be it known that we, EDWIN O. BARSTOW and COULTER W. JONES, citizens of the United States, and residents of Midland, county of Midland, State of Michigan, have jointly invented a new and useful Improvement in Processes of Making Potassium Bromid, of which the following is a specification, the principle of the invention being herein explained and the best mode in which we have contemplated applying that principle, so as to distinguish it from other inventions.

In the recovery of bromin from brine, by the method or process described in United States Letters Patent Re. No. 11,232, to Herbert H. Dow, dated April 12, 1892, the bromin, after being freed from its chemical combination, is blown out of the brine by passing a current of air therethrough, and then is subsequently absorbed from such air. The particular reagent used for thus absorbing the bromin, will, among other things, depend upon the product desired. Thus where potassium bromid is to be the ultimate product, potassium carbonate may be used as such reagent, and this will apply not merely to the recovery of bromin by the specific process referred to above, but to any analogous process.

Where, however, the potassium bromid is to be of U. S. P. standard of quality, considerable difficulty is encountered in obtaining potassium carbonate of requisite purity, since this salt will always contain a small percentage of sodium carbonate, except where it has been subjected to expensive methods of purification. Thus the available salt ordinarily runs approximately ninety-five per cent. potassium carbonate and five per cent. sodium carbonate.

The object of the present invention is to provide a suitable process for utilizing this mixture in the manufacture of pure potassium bromid, that is potassium bromid that will comply with the specifications of the U. S. Pharmacopœia. To the accomplishment of this end, said invention, then, consists of the steps hereinafter fully described and particularly pointed out in the claims, the following description setting forth certain steps embodying the invention, which, however, constitute but one of various ways in which the principle of the invention may be used.

According to our present improved process, we directly react with the free bromin on the mixture of potassium and sodium carbonates referred to above as being the one best available for the purpose. Such mixture is thereby converted into the corresponding potassium and sodium bromids in accordance with the reactions described in U. S. Patent No. 765,417 to H. H. Dow, dated July 19, 1904, the reaction in the case of the potassium salt, for example, apparently being as follows:

$6K_2CO_3 + 6Br + 3H_2O =$
$\qquad 5KBr + KBrO_3 + 6KHCO_3$,
and
$6KHCO_3 + 6Br =$
$\qquad 5KBr + KBrO_3 + 3H_2O + 6CO_2$.

The resulting solution of mixed bromids is now boiled to hot saturation, and such boiling continued therebeyond until a considerable proportion of the potassium bromid is "salted" (that is crystallizes) out. The solution is then allowed to stand and cool to a temperature not lower than 50° C., as a result of which a further quantity of potassium bromid separates out. The crystalized potassium bromid produced by the foregoing treatment is then separated from the mother liquor by draining and wheeling in a centrifugal machine, and will be found very much lower in soda than the liquor from which it was crystallized. Where the original mixture contains the two carbonates in approximately the proportions stated above, we find that this first crystallization product of potassium bromid is usually sufficiently pure to meet the U. S. P. requirements.

The mother liquor remaining after separating out such potassium bromid is then again boiled and treated exactly as was the previously mixed bromid solution, thereby producing another lot of potassium bromid, which, however, will be somewhat higher in soda than the first product. The product from this second boiling out step is accordingly dissolved and treated the same as the original solution in order to get potassium bromid of the required degree of purity, and the mother liquor is thus repeatedly treated by being boiled beyond the hot saturation point, and then cooled to approximately 50° C., as in the first step, until the proportion of sodium bromid rises to approximately 50 per cent. of the total salt content of such liquor.

When this stage is reached the mother liquor is treated as follows, viz., a solution of sodium bromate, or a solution containing a mixture of sodium bromid and sodium bromate, is added to such mother liquor, whereupon potassium bromate will be precipitated in accordance with the following equation:—

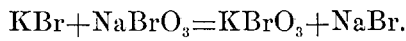

The remaining solution will contain sodium bromid with only a very small amount of potassium present, corresponding to the solubility of the potassium bromate. The potassium bromate precipitate is separated out and can be used as such or be converted into potassium bromid by well known methods if desired, while the sodium bromid solution that remains is then treated for the recovery of the contained bromin either by treatment with chlorin or with sulfuric acid and an oxidizing agent, as for example sodium bromate.

If desired the last described step in which potassium bromate is precipitated by means of sodium bromate may be omitted and the mother liquor from the final crystallizing step, containing fifty per cent., or so, of sodium bromid in its dissolved solids may be treated to recover the bromin by either of the methods just described, viz., with chlorin or sulfuric acid and an oxidizing agent.

Whether the bromin be thus recovered immediately following the final crystallizing step or after subsequent precipitation of potassium bromate, the remaining liquors, containing either a mixture of sodium and potassium chlorids or sulfates, depending upon which method of recovery is adopted, may be used, along with raw material, in the manufacture of potassium carbonate, and the potassium therein thus saved for further treatment in the bromid plant. It is quite possible that where the sodium bromate treatment is used subsequently to the final crystallizing step, the potash in the remaining liquor, after the bromin has been recovered therefrom, will be so small as to render it uneconomical to further treat such liquor, so that it may rather be thrown away.

Other modes of applying the principle of our invention may be employed instead of the one explained, change being made as regards the process herein disclosed, provided the step or steps stated by any one of the following claims or the equivalent of such stated step or steps be employd.

We therefore particularly point out and distinctly claim as our invention:—

1. In a method of making substantially pure potassium bromid from potassium carbonate containing a relatively small admixture of sodium carbonate, the steps which consist in reacting on such mixed carbonates in solution with free bromin, whereby a solution of mixed bromids is formed; and boiling such solution to a point beyond hot saturation and then cooling to not lower than 50° C., whereupon substantially pure potassium bromid crystallizes out.

2. In a method of making substantially pure potassium bromid from potassium carbonate containing an admixture of approximately five per cent. sodium carbonate, the steps which consist in reacting on such mixed carbonates in solution with free bromin, whereby a solution of mixed bromids is formed; boiling such solution to a point beyond hot saturation and then cooling to approximately 50° C., whereupon substantially pure potassium bromid crystallizes out.

3. In a method of making substantially pure potassium bromid from potassium carbonate containing a relatively small admixture of sodium carbonate, the steps which consist in reacting on such mixed carbonates in solution with free bromin, whereby a solution of mixed bromids is formed; boiling such solution to a point beyond hot saturation and then cooling to not lower than 50° C., whereupon substantially pure potassium bromid crystallizes out; boiling down the residual solution whereby potassium bromid admixed with sodium bromid crystallizes out; redissolving such potassium bromid; boiling the same as before; and repeating such dissolving and boiling steps until a product of the desired degree of purity is obtained.

4. In a method of making substantially pure potassium bromid from potassium carbonate containing an admixture of approximately five per cent. sodium carbonate, the steps which consist in reacting on such mixed carbonates in solution with free bromin, whereby a solution of mixed bromids is formed; boiling such solution to a point beyond hot saturation and then cooling to approximately 50° C., whereupon substantially pure potassium bromid crystallizes out; and boiling down the residual solution, whereby potassium bromid, admixed with sodium bromid crystallizes out.

5. In a method of making substantially pure potassium bromid from potassium carbonate containing a relatively small admixture of sodium carbonate, the steps which consist in reacting on such mixed carbonates in solution with free bromin, whereby a solution of mixed bromids is formed; boiling such solution to a point beyond hot saturation and then cooling to not lower than 50° C., whereupon substantially pure potassium bromid crystallizes out; boiling down the residual solution, whereby potassium bromid admixed with sodium bromid crystallizes out, and repeating such boiling down until the proportion of sodium bromid is approximately 50 per cent. of the total salt content in solution; and then adding sodium bromate to the final solution, whereby any remaining potassium is precipitated as bromate.

6. In a method of making substantially pure potassium bromid from potassium carbonate containing an admixture of approximately five per cent. sodium carbonate, the steps which consist in reacting on such mixed carbonates in solution with free bromin, whereby a solution of mixed bromids is formed; boiling such solution to a point beyond hot saturation and then cooling to approximately 50° C., whereupon substantially pure potassium bromid crystallizes out; successively boiling down the residual solution and separating the potassium bromid admixed with sodium bromid that crystallizes out; until the proportion of sodium bromid rises to approximately fifty per cent. of the total salt content in solution; and then adding sodium bromate to such solution, whereby any remaining potassium is precipitated as bromate.

7. In a method of making substantially pure potassium bromid from potassium carbonate containing a relatively small admixture of sodium carbonate, the steps which consist in reacting on such mixed carbonates in solution with free bromin, whereby a solution of mixed bromids is formed; boiling such solution to a point beyond hot saturation and then cooling to not lower than 50° C.; whereupon substantially pure potassium bromid crystallizes out; successively boiling down the residual solution and separating the potassium bromid admixed with sodium bromid that crystallizes out; until the proportion of sodium bromid rises to approximately fifty per cent. of the total salt content in solution; then adding sodium bromate to such solution, whereby any remaining potassium is precipitated as bromate; and recovering the bromin from any bromids remaining in the final solution.

8. In a method of making substantially pure potassium bromid from potassium carbonate containing an admixture of approximately five per cent. sodium carbonate, the steps which consist in reacting on such mixed carbonates in solution with free bromin, whereby a solution of mixed bromids is formed; boiling such solution to a point beyond hot saturation and then cooling to approximately 50° C., whereupon substantially pure potassium bromid crystallizes out; successively boiling down the residual solution and separating the potassium bromid admixed with sodium bromid that crystallizes out; until the proportion of sodium bromid rises to approximately fifty per cent. of the total salt content in solution; then adding sodium bromate to such solution, whereby any remaining potassium is precipitated as bromate; freeing the bromin from any bromids remaining in the final solution; and converting any resulting potassium salts to the carbonate for use in the first-described step.

Signed by me, this 8th day of May, 1917.
EDWIN O. BARSTOW.
Signed by me this 12th day of May, 1917.
COULTER W. JONES.